(12) United States Patent
Mattila

(10) Patent No.: US 9,068,839 B2
(45) Date of Patent: Jun. 30, 2015

(54) METHOD AND APPARATUS FOR PROVIDING SHADOW-BASED LOCATION POSITIONING

(75) Inventor: Ville-Veikko Mattila, Tampere (FI)

(73) Assignee: NOKIA TECHNOLOGIES OY, Sunnyvale (CA)

( * ) Notice: Subject to any disclaimer, the term of this patent is extended or adjusted under 35 U.S.C. 154(b) by 393 days.

(21) Appl. No.: 13/538,341

(22) Filed: Jun. 29, 2012

(65) Prior Publication Data

US 2014/0005919 A1  Jan. 2, 2014

(51) Int. Cl.
*G01C 21/00* (2006.01)
(52) U.S. Cl.
CPC ...................................... *G01C 21/00* (2013.01)
(58) Field of Classification Search
CPC . G01C 21/00; G06K 9/2036; G06K 9/00805; G06K 9/62; G06K 9/46; G06T 2207/20144; G06T 2207/20012
USPC ......... 701/400, 408, 410, 423, 446, 469, 533; 340/995.28
See application file for complete search history.

(56) References Cited

U.S. PATENT DOCUMENTS

| | | | |
|---|---|---|---|
| 7,117,087 B2* | 10/2006 | Jung et al. .................... | 701/446 |
| 7,233,683 B2* | 6/2007 | Han et al. ..................... | 382/104 |
| 7,647,171 B2* | 1/2010 | Horvitz et al. ................ | 701/469 |
| 2004/0073364 A1* | 4/2004 | Jung et al. .................... | 701/213 |
| 2007/0005243 A1* | 1/2007 | Horvitz et al. ................ | 701/213 |
| 2010/0254595 A1* | 10/2010 | Miyamoto .................... | 382/159 |
| 2012/0232787 A1* | 9/2012 | Kunath et al. ................. | 701/423 |

FOREIGN PATENT DOCUMENTS

WO    WO 2008140166 A1 * 11/2008 ............. G01C 21/30

OTHER PUBLICATIONS

Groves et al, Shadow Matching—Improved GNSS Accuracy in Urban Canyons, Feb. 2012, GPS World, pp. 14-29.*
Wang et al., Multi-Constellation GNSS Performance Evaluation for Urban Canyons Using Large Virtual Reality City Models, 2012, The Journal of Navigation, The Royal Institute of Navigation, vol. 65, pp. 459-476.*
Groves, Paul D., Shadow Matching—A New GNSS Positioning Technique for Urban Canyons, The Journal of Navigation, The Royal Institute of Navigation, vol. 64, pp. 417-430.*

* cited by examiner

*Primary Examiner* — Dalena Tran
*Assistant Examiner* — Jaime Figueroa
(74) *Attorney, Agent, or Firm* — Ditthavong & Steiner, P.C.

(57) ABSTRACT

An approach for providing shadow-based location positioning is described. A visual location platform processes and/or facilitates a processing of sensor information associated with at least one device traveling on at least one route to determine at least one pattern of shadows on the at least one route. The visual location platform also causes, at least in part, a comparison of the at least one pattern of shadows against one or more reference patterns of shadows associated with one or more known locations. The service platform further causes, at least in part, an estimation of a location, a direction of travel, or a combination thereof of the at least one device based, at least in part, on the comparison.

20 Claims, 10 Drawing Sheets

100

US 9,068,839 B2

METHOD AND APPARATUS FOR PROVIDING SHADOW-BASED LOCATION POSITIONING

BACKGROUND

Service providers and device manufacturers (e.g., wireless, cellular, etc.) are continually challenged to deliver value and convenience to consumers by, for example, providing compelling network services. One area of development relates to location-based services that rely on location or positioning information. However, positioning technologies such as satellite-based positioning (e.g., Global Positioning System (GPS) based positioning) are susceptible to interference that may make GPS-equipped mobile devices unable to provide positioning information. This problem is particularly acute in city centers where the "urban canyon effect" may make GPS systems less accurate or unable to function. Accordingly, service providers and device manufacturers face significant technical challenges to providing a location positioning service that can operate in place of traditional positioning technologies.

SOME EXAMPLE EMBODIMENTS

Therefore, there is a need for an approach for providing a shadow-based (or visual-based) location positioning process that, for instance, determines a user's location independently of satellite-based and other traditional location (e.g., cellular triangulation, WiFi, etc.) positioning systems.

According to one embodiment, a method comprises processing and/or facilitating a processing of sensor information associated with at least one device traveling on at least one route to determine at least one pattern of shadows on the at least one route. The method also comprises causing, at least in part, a comparison of the at least one pattern of shadows against one or more reference patterns of shadows associated with one or more known locations. The method further comprises causing, at least in part, an estimation of a location, a direction of travel, or a combination thereof of the at least one device based, at least in part, on the comparison.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of sensor information associated with at least one device traveling on at least one route to determine at least one pattern of shadows on the at least one route. The apparatus also causes, at least in part, a comparison of the at least one pattern of shadows against one or more reference patterns of shadows associated with one or more known locations. The apparatus further causes, at least in part, an estimation of a location, a direction of travel, or a combination thereof of the at least one device based, at least in part, on the comparison.

According to another embodiment, a computer-readable storage medium carries one or more sequences of one or more instructions which, when executed by one or more processors, cause, at least in part, an apparatus to process and/or facilitate a processing of sensor data, other data, or a combination thereof to process and/or facilitate a processing of sensor information associated with at least one device traveling on at least one route to determine at least one pattern of shadows on the at least one route. The apparatus also causes, at least in part, a comparison of the at least one pattern of shadows against one or more reference patterns of shadows associated with one or more known locations. The apparatus further causes, at least in part, an estimation of a location, a direction of travel, or a combination thereof of the at least one device based, at least in part, on the comparison.

According to another embodiment, an apparatus comprises means for processing and/or facilitating a processing of sensor information associated with at least one device traveling on at least one route to determine at least one pattern of shadows on the at least one route. The apparatus also comprises means for causing, at least in part, a comparison of the at least one pattern of shadows against one or more reference patterns of shadows associated with one or more known locations. The apparatus further comprises means for causing, at least in part, an estimation of a location, a direction of travel, or a combination thereof of the at least one device based, at least in part, on the comparison.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-8, 21-28, and 42-44.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing shadow-based location positioning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
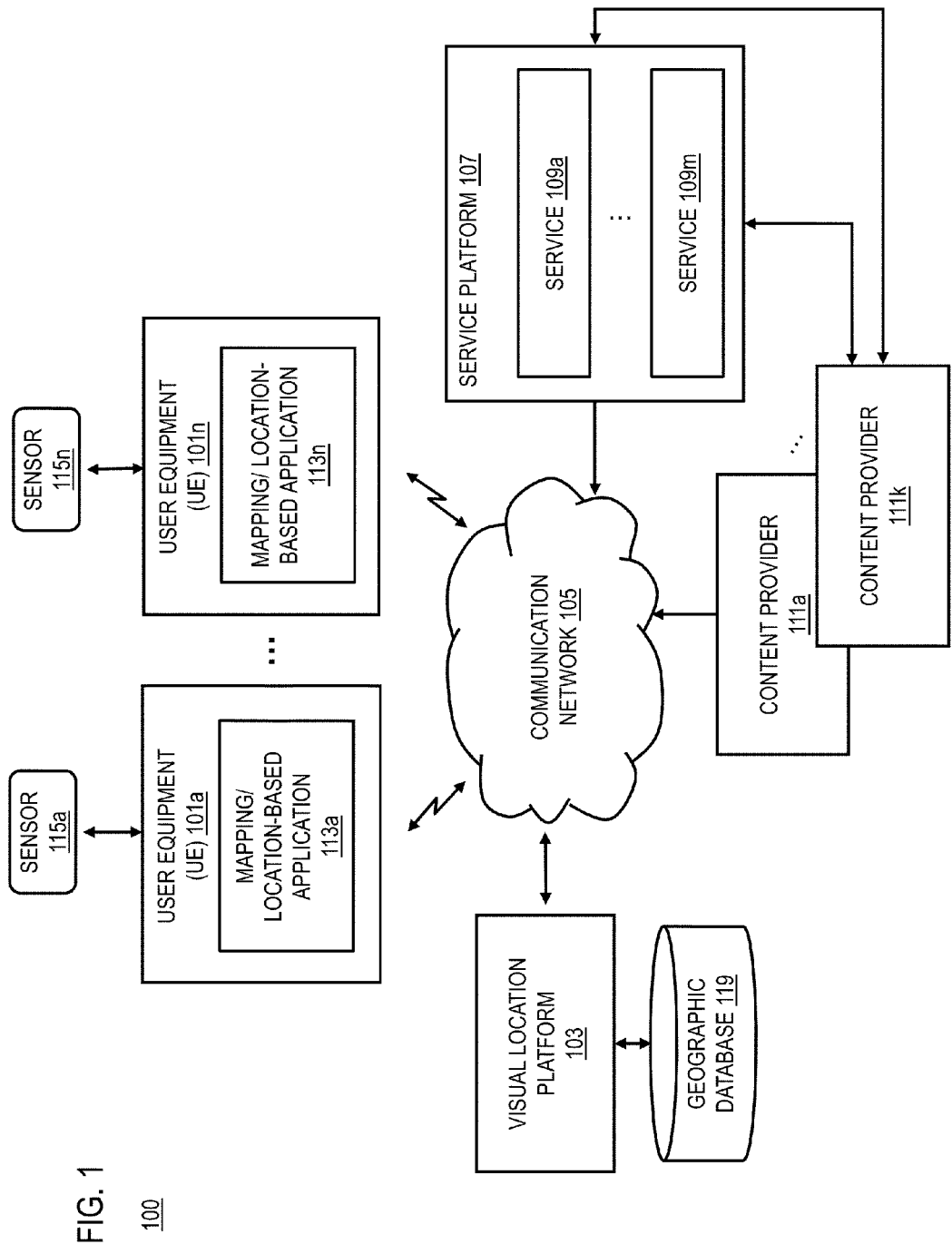
FIG. 1 is a diagram of a system capable of providing shadow-based location positioning, according to one embodiment.

FIG. 1 is a diagram of a system capable of detecting points of interest or events based on geotagged data and geolocation seeds, according to one embodiment. One of the challenges in providing location positioning services is maintaining uninterrupted service against obstructive environmental conditions, such as weather conditions, terrain conditions, structural conditions, etc. For example, urban city centers with high-rise buildings may introduce problems for GPS or other satellite (e.g., GLONASS) based location positioning because the building may occlude or interfere with signals from the corresponding satellites. This "urban canyon effect" may cause GPS-equipped mobile devices to lose their ability to provide location estimates at the street level.

To address this problem, a system 100 of FIG. 1 introduces the capability to provide shadow-based location positioning that relies on determining location information by sensing patterns of cast shadows that may uniquely identified a particular location. In one embodiment, the system 100 makes use of three-dimensional city models (e.g., building models, terrain models, or other feature models such as models of trees, light poles, and other similar objects in the environment) to estimate how shadows are cast onto streets or other travel routes as a function of time of day and/or time of year. More specifically, a mobile device (e.g., a handheld device or an in-car navigation system) can sense or measure (e.g., via a light sensor, camera, or other visual detector) the periods of being and not being in shadow while traveling along a route. This measured pattern of shadows can then be compared against reference shadow patterns that correspond to known locations to estimate a location and/or direction of travel of the mobile device.

As noted above, in one embodiment, based on knowing the time of the year and day, the system 100 can calculate the position of the sun in the sky. The sun's position and the corresponding building and terrain models for a particular area can then be used to estimate how shadows are cast onto the streets. For example, during the day, the shadows are continuously changing as the sun moves across the sky, which is furthermore dependent on the time of the year. When cars or devices drive along a street or route, these shadows appear in a sequence or pattern of lighter and darker sections of the street. The pattern of shadows (e.g., light-dark sections) can create a unique pattern for every street or route. This pattern is dependent on the environmental features (e.g., buildings, terrain, etc.) surrounding the street or route. Accordingly, the system 100 enables devices (e.g., in-car navigation devices, personal navigation devices, etc.) equipped with a visual sensor to detect patterns of shadows so that the system 100 can calculate the devices' locations and directions of travel.

In one embodiment, the system 100 can precompute reference patterns of shadows for all or a portion of the travel routes stored in the system 100 for different times of the year and day. Accordingly, as a device is determined to be within a general area, the system 100 can transmit or otherwise provide reference patterns of shadows for possible routes or streets within vicinity of the device for the appropriate time of the year and day. In addition or alternatively, the system 100 can configure the devices with models of building and terrain features to enable the devices to calculate the reference shadow patterns as needed. In one embodiment, the models may be determined using sensing technologies such as Light Detection and Ranging (LIDAR), Radio Detection and Ranging (RADAR), and the like. In some embodiments, LIDAR or RADAR may be sensed in substantially real-time to determine the models. In addition or alternatively, models may be pre-generated from previously collected sensing data. These data can then be made available from one or more mapping services.

In another embodiment, the reference patterns of shadows may be determined by other means than calculating from models as described above. For example, measurements of shadow patterns can be stored in the system 100 as reference patterns. In this embodiment or use case, the system 100 may obtain the measurements from devices that travel the routes at various times. These devices may be mounted on service specific vehicles (e.g., vehicles designed specifically to collect location information) or may be obtained via crowd-sourcing from user devices or vehicles contributing to the system. In one embodiment, if there are gaps in measured data, the system 100 may interpolate the shadows patterns collected from adjacent time periods or may estimate the patterns in the gap from models as described above.

In yet another embodiment, the system 100 can normalize measured shadow patterns based on the speed the device or vehicle was traveling when conducting the measurements. For example, shadow measurements may be made at a constant sampling rate, so that a faster moving device or vehicle may appear to have condensed shadow patterns versus slower moving vehicles. In this case, the system 100, for instance, can adjust the measure data to a common rate that matches the reference shadow patterns to facilitate comparison and matching.

In one embodiment, the system 100 may employ shadow-based location positioning in tandem with other location positioning technologies (e.g., GPS, cellular triangulation, etc.) available to the device. For example, the system 100 may initiate the shadow-based location positioning service when it determines that other location positioning technologies are suffering from performance degradation (e.g., from loss of GPS satellite reception in urban canyons). In some embodiments, when the performance of other technologies is degraded (e.g., accuracy levels are not high enough to locate a device at a street level or better), the system 100 may still use the general location information provided by other the other technologies to select the reference shadow patterns or corresponding locations associated with reference shadow patterns for caching or transmittal to the device.

As shown in FIG. 1, the system 100 comprises one or more user equipment (UEs) 101a-101n (also collectively referred to as UEs 101) having connectivity to a visual location platform 103 via a communication network 105. In one embodiment, the visual location platform 103 performs the shadow-based location positioning process described herein. The UEs 101 also have connectivity to a service platform 107 that includes one or more services 109a-109m (also collectivity referred to as services 109) for providing mapping and/or location-based services that may employ the shadow-based location positioning service of the visual location platform 103. In one embodiment, the service platform 107 and/or services 109 interact with one or more content providers 111-111k (also collectively referred to as content providers 111) to provide mapping information or user generated content information (e.g., crowdsourced reference shadow patterns for specific locations) to the visual location platform 103. In one embodiment, the visual location platform 103 may store mapping information, navigation information, measured shadow patterns, reference shadow patterns, environmental models (e.g., buildings, terrain, and other objects that may be present at a location), and other data or information used in the various embodiments of the system 100 described herein. As discussed above, the models may be created to replicate objects that can cast shadows on the street. In some cases, the models may be created or sensed using LIDAR or other similar sensing technology.

In one embodiment, the UEs 101 contain one or more mapping/location-based applications 113a-113n (also collectively referred to as mapping/location-based applications 113). The mapping/location-based applications 113 enable the UEs 101 to access shadow-based location positioning service of the visual location platform 103. In addition, the UEs 101 have access to one or more visual sensors 115a-115n (also collectively referred sensors 115) including, for instance, light sensors, cameras, reflectivity sensors, and the like. In one embodiment, if the UEs 101 are equipped with reflectivity sensors, the system 100 can employ reflectivity patterns of surrounding building and terrain to determine a unique visual pattern for determining location information for a device. Similar to modeling of cast shadows, the system 100 can model the reflectivity of buildings and terrains to determine light levels along a street or route to uniquely identity the street or route. In one embodiment, the system 100 may use reflectivity patterns as an alternate or in addition to shadow patterns to estimate device location information.

In one embodiment, the visual location platform 103 may exist independently or within a cloud computing and/or cloud storage platform. In other embodiments, the visual location platform 103 may be located in the service platform 107, the services 109, the applications 113, the UE 101, or other component of the system 100.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, automobile, or any combination thereof, including the accessories and peripherals of these devices, or any combination thereof. It is also contemplated that the UE 101 can support any type of interface to the user (such as "wearable" circuitry, etc.).

By way of example, the communication network 105 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101 and the visual location platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the mapping/location-based applications 113 and the visual location platform 103 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
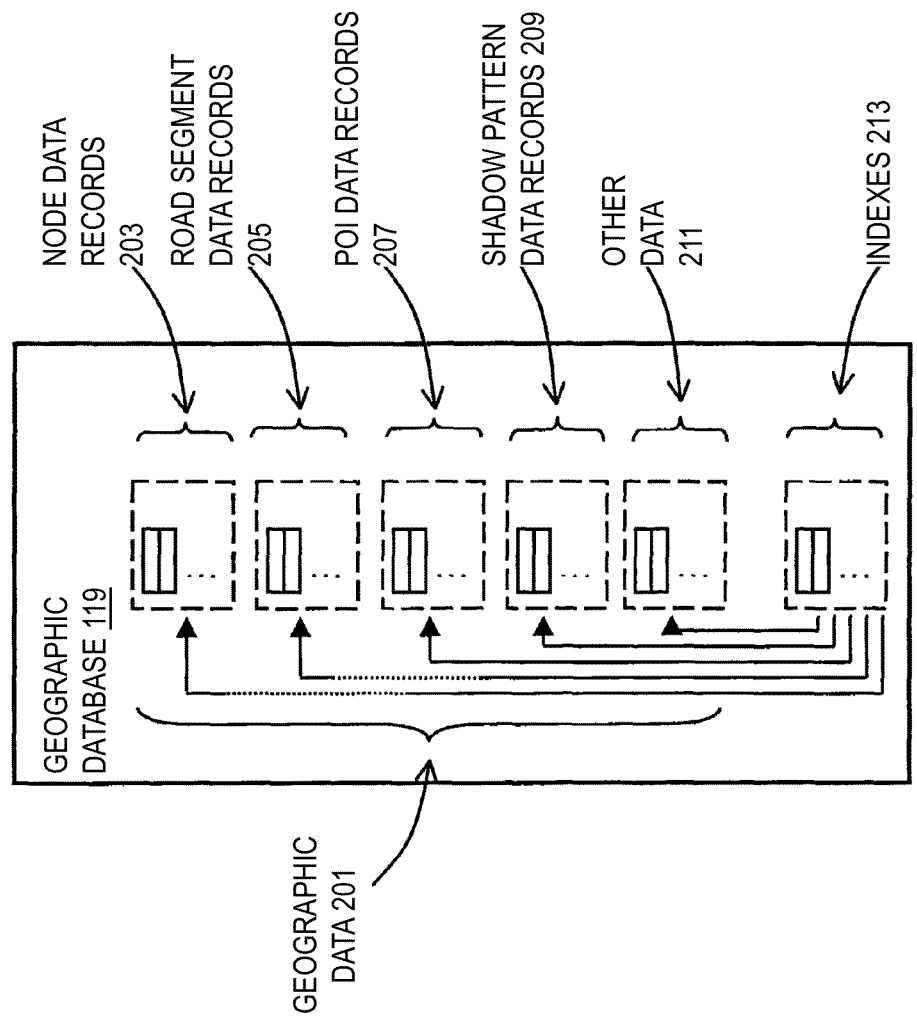
FIG. 2 is a diagram of a geographic database, according to one embodiment.

FIG. 2 is a diagram of a geographic database, according to one embodiment. In one embodiment, the reference shadow patterns and/or measured shadow patterns determined by the visual location platform 103 may be stored in the geographic database 119 or data thereof. In one embodiment, the geographic or map database 119 includes geographic data 201 used for (or configured to be compiled to be used for) navigation-related services. For example, the geographic database 119 includes node data records 203, road segment or link data records 205, POI data records 207, shadow pattern data records 209, and other data records 211. More, fewer, or different data records may be provided. In one embodiment, the other data records 211 include cartographic ("carto") data records, routing data, and maneuver data. One or more portions, components, areas, layers, features, text, and/or symbols of the POI or event data may be stored in, linked to, and/or associated with one or more of these data records. For example, one or more portions of the POI or event data may be matched with respective map or geographic records via shadow-based location positioning or GPS data associations (such as using known or future map matching or geo-coding techniques).

In one embodiment, the road segment data records 205 are links or segments representing roads, streets, or paths. The node data records 203 are end points corresponding to the respective links or segments of the road segment data records 205. The road link data records 205 and the node data records 203 represent a road network, such as used by vehicles, cars, and/or other entities. Alternatively, the geographic database 119 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 may include data about the POIs and their respective locations in the POI data records 207. The geographic database 119 may also include data about places, such as cities, towns, or other communities, and other geographic features, such as bodies of water, mountain ranges, etc. Such place or feature data may be part of the POI data 207 or may be associated with POIs or POI data 207 (such as a data point used for displaying or representing a position of a city). In addition, the geographic database 119 may include data about location-based events and their respective locations in the POI data records 207. By way of example, the location-based events include any type of event that is associated with a particular location including, for instance, traffic, accidents, construction, public gatherings, etc.

The geographic database 119 may be maintained by the content provider 115 (e.g., a map developer). For example, a map developer collects geographic data to generate and enhance the database 119. There are different ways used by the map developer to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 119 may be a master geographic database stored in a format that facilitates updating, maintenance, and development. For example, the master geographic database 119 or data in the master geographic database 119 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 119 may be a master geographic database, but in alternate embodiments, the database may represent a compiled navigation database that may be used in or with end user devices (e.g., UEs 101) to provided navigation-related functions. For example, the database 119 may be used with the end user device 101 to provide an end user with navigation features. In such a case, the database may be downloaded or stored on the end user device 101, or the end user device 101 may access the database 119 through a wireless or wired connection (such as via a server and/or network 105). In one embodiment, the database 119 includes indexes 213 of the records 203-211 to facilitate access (e.g., such as random access to specific records or ranges or records).

In one embodiment, the end user device or UE 101 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 101 is a cellular telephone. An end user may use the device 101 for navigation functions such as guidance and map display.

Figure 3:
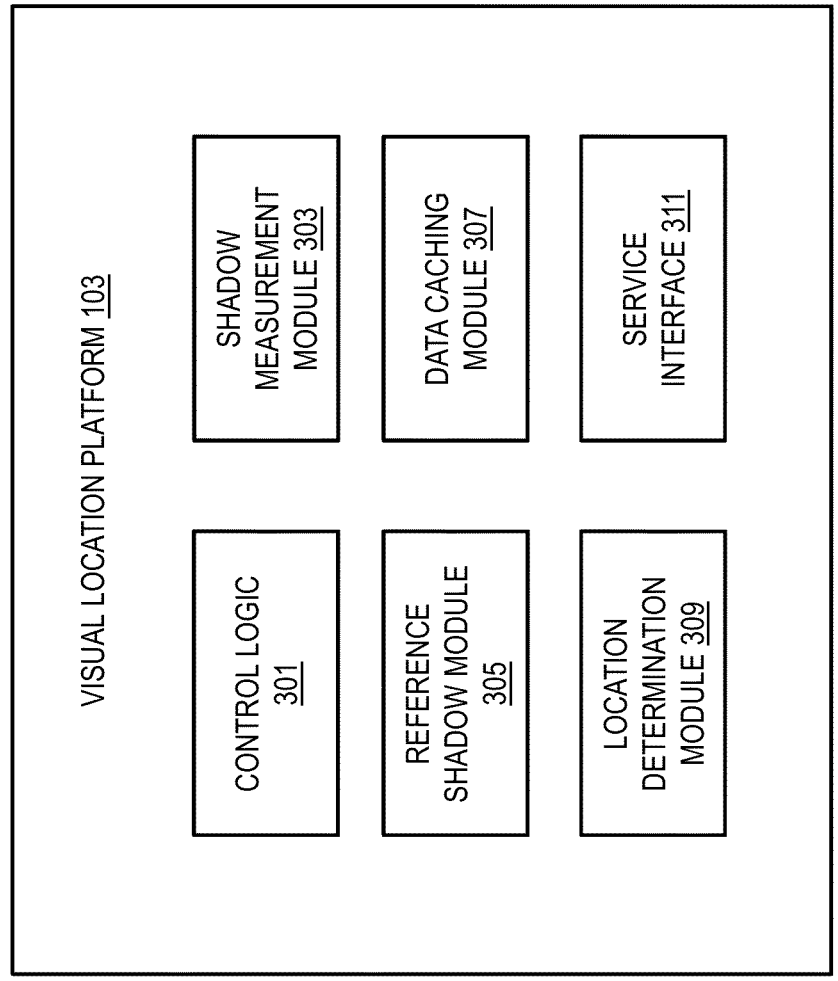
FIG. 3 is a diagram of the components of a visual location platform, according to one embodiment.

FIG. 3 is a diagram of components of a visual location platform, according to one embodiment. By way of example, the visual location platform 103 includes one or more components for providing shadow-based location positioning. It is contemplated that the functions of these components may be combined in one or more components or performed by other components of equivalent functionality (e.g., the services 109, the applications 113). In this embodiment, the visual location platform 103 includes a control logic 301, a shadow measurement module 303, a reference shadow module 305, a data caching module 307, a location determination module 309, and a service interface 311.

In one embodiment, the control logic 301 executes one or more algorithms for providing shadow-based location positioning. In this example, the control logic 301 interacts with a shadow measurement module 303 to determine measured shadow patterns collected as a device (e.g., a UE 101) travels along a street or route. As discussed previously, the measured shadow patterns comprise periods of detected lighter and darker areas of a street as measured by a visual sensor 115. For example, the visual sensor 115 (e.g., a light sensor, a camera, etc.) may be used to detect ambient light levels. When ambient light levels are below a threshold value, the shadow measurement module 303 may determine that it is in a shadow. Conversely, if the ambient light levels are above the threshold, the measurement module 303 may determine a non-shadow segment of the route. By collecting the shadow measurements over a distance, the shadow measurement module 303 can construct pattern or sequence that represents the traveled segment.

As previously discussed, the shadow measurement module 303 can normalize or adjust a measured shadow pattern based on the speed of the device collecting the pattern. For example, a fast moving device or a device is that is traveling a variable speed (e.g., because of traffic patterns, speed limits, road conditions, etc.) can result in an irregular shadow. Accordingly, in one embodiment, the shadow measurement module 303 may use the speed to calculate the effective distance for each light or dark period to normalize the patterns. Alternatively, the shadow measurement module 303 can process the patterns to stretch or condense the pattern to a reference speed. For example, the measured shadow patterns can be normalized to a collection speed of 25 miles per hour or any other speed.

In another embodiment, the shadow measurement module 303 may instruct or cause a device to continuously monitor the shadow patterns in a streaming manner, or may instruct the device to collect the measurements at a specified frequency and/or duration. In some embodiments, the length of the shadow pattern to measure can be based on the estimated uniqueness of the surrounding buildings or terrain. For example, a street with very regular buildings lining it may need to be sampled for longer distances or periods to obtain a unique shadow pattern for the route or street segment.

Once the shadow measurement module 303 obtains one or more measured shadow segments from a device, the shadow measurement module 303 can interact with the reference shadow module 305 to obtain reference shadow patterns associated with known locations for comparison against the measure shadow patterns. In one embodiment, the visual location platform 103 can transmit relevant segments of the shadow patterns to the UE 101 for location determination. For example, the UE 101 may report a general location. Then the reference shadow module may calculate or retrieve the reference patterns for streets or routes within vicinity of the general location. In one embodiment, on receiving a request for reference shadow patterns, the reference shadow module 305 can compute the reference shadow patterns from environmental models on demand (e.g., using ray-tracing or other three-dimensional rendering techniques). In other embodiments, the reference shadow module 305 can precompute the reference shadow patterns for one or more regions. In this case, the reference shadow module 305 need only retrieve the reference patterns for transmission of the UE 101. In another embodiment, the reference shadow module 305 can provide models or links to the models to the UE 101 so that the UE 101 can compute its own. In yet another embodiment, the UE 101 may be equipped with sensing technologies such as LIDAR or RADAR to model the surrounding environment in real-time as the UE 101 travels along a route.

In one embodiment, the reference shadow module 305 can interact with the data caching module 307 determine which portions of the reference shadow patterns and corresponding known locations to transmit or provide to the UE 101 for caching. For example, the data caching module 307 can monitor a general or current location of the device (e.g., location determined from other location positioning technologies available to the UE 101) to determine reference shadow data or models to cache at the UE 101.

The location determination module 309 can then match the measured shadow patterns against the reference shadow patterns to determine a location or travel direction of the UE 101. For example, the reference shadow patterns are unique to a particular route or segment of the route. Accordingly, if the measured shadow patterns at least substantially matches the reference pattern, the location determination module 309 can estimate the UE 101's location as corresponding to the known location associated with the matching reference segment. The sequence of the measured shadow patterns can also be used to determine which direction on the matching route the UE 101 is traveling. For example, order of encountering the shadows can be used to infer heading or direction. The location determination module 309 can then provide the estimated location information to other services 109, the applications 113, or other location-based services via the service interface 311.

Figure 4:
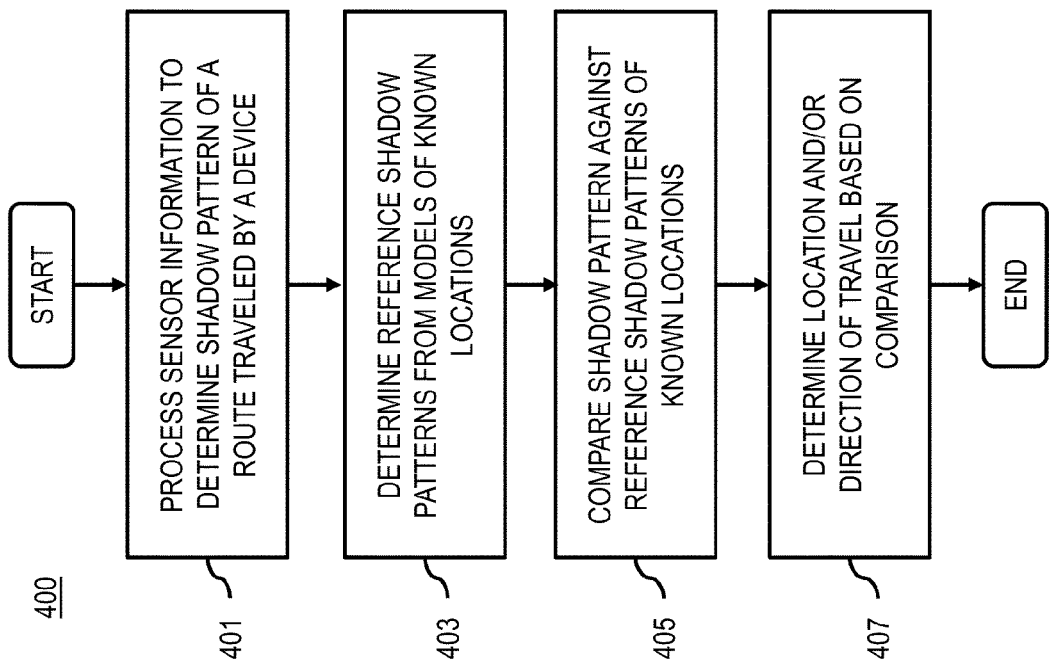
FIG. 4 is a flowchart of a process for providing shadow-based location positioning, according to one embodiment.
Figure 9:
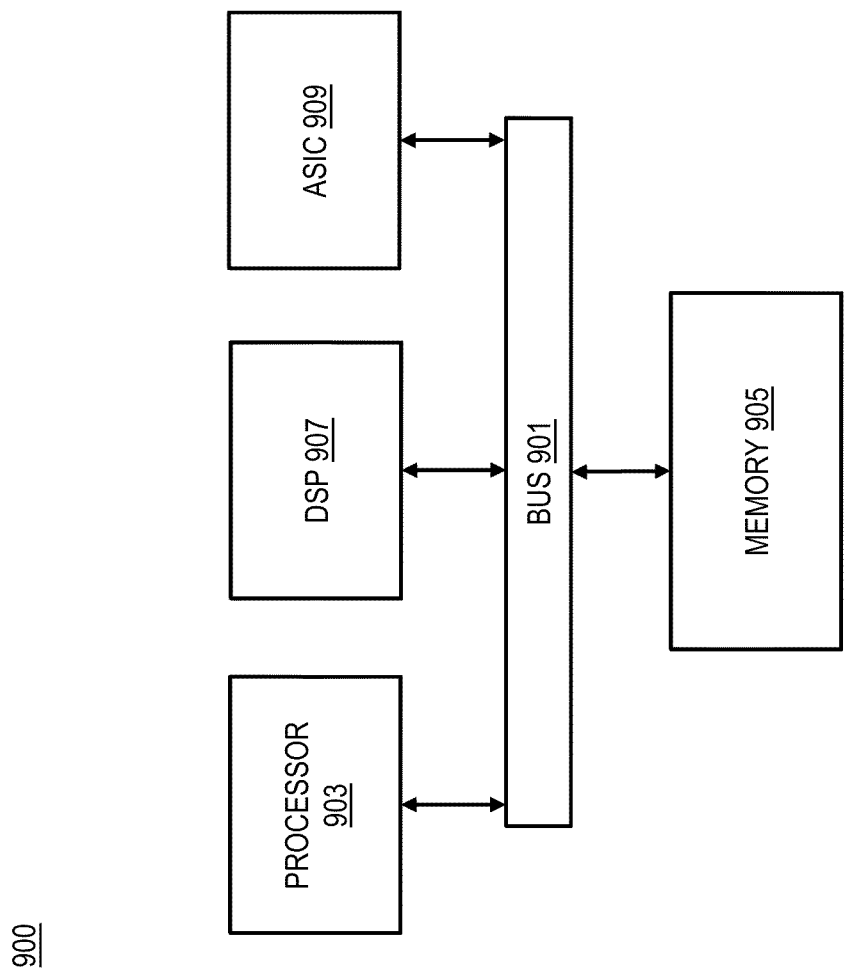
FIG. 9 is a diagram of a chip set that can be used to implement an embodiment of the invention.

FIG. 4 is a flowchart of a process for providing shadow-based location positioning, according to one embodiment. In one embodiment, the visual location platform 103 performs the process 400 and is implemented in, for instance, a chip set including a processor and a memory as shown in FIG. 9. In addition or alternatively, the mapping/location-based application 113 can perform all or a portion of the process 400.

In step 401, the visual location platform 103 processes and/or facilitates a processing of sensor information associated with at least one device traveling on at least one route to determine at least one pattern of shadows on the at least one route. As discussed, the sensor information includes, at least in part, light sensor information, visual detector information, or a combination thereof. This sensor information is processed to determine periods of dark (e.g., shadows) and light (e.g., non-shadows) encountered by the UE 101 along a route or street. In other words, the visual location platform 103 determines determine the one or more patterns based, at least in part, on a presence or an absence of shadow as indicated by the sensor information. In one embodiment, the visual location platform 103 also causes, at least in part, a normalization of the at least one pattern of shadows based, at least in part, on a speed of the at least one device. This normalization, for instance, enables shadow patterns measured at different speeds to be comparable.

In step 403, the visual location platform 103 determines reference shadow patterns associated with known locations. For example, the visual location platform 103 determines one or more models (e.g., three-dimensional models) of one or more features associated with the one or more known locations. In one embodiment, the one or more features include one or more buildings, one or more terrain features, or a combination thereof associated with the one or more known locations. The visual location platform 103 then processes and/or facilitates a processing of the one or more models to determine one or more shadows cast at the one or more known locations, wherein the one or more reference patterns of shadows are based, at least in part, on the one or more shadows. This processing includes, for instance, determining a three-dimensional ray-tracing or other rendering of the model to simulate the corresponding environment of the models. Because shadows change with the position of the sun, the visual location platform 103 can determine the one or more reference patterns of shadows, the one or more shadows cast the one or more known locations, or a combination thereof based, at least in part, on a time-of-day parameter, a time-of-year parameter, or a combination thereof.

In step 405, the visual location platform 103 causes, at least in part, a comparison of at least one pattern of shadows against one or more reference patterns of shadows associated with one or more known locations. The visual location platform 103 then causes, at least in part, an estimation of a location, a direction of travel, or a combination thereof of the at least one device based, at least in part, on the comparison (step 407). It is noted that the accuracy of the location estimation depends on a uniqueness of the measured and reference shadow patterns. For example, longer sequences or patterns of shadows can potentially be more unique than shorter sequences. Accordingly, in one embodiment, the visual location platform 103 can vary or alter the length of the sequences depending on the variability of the building and terrain models for a given area.

Figure 5:
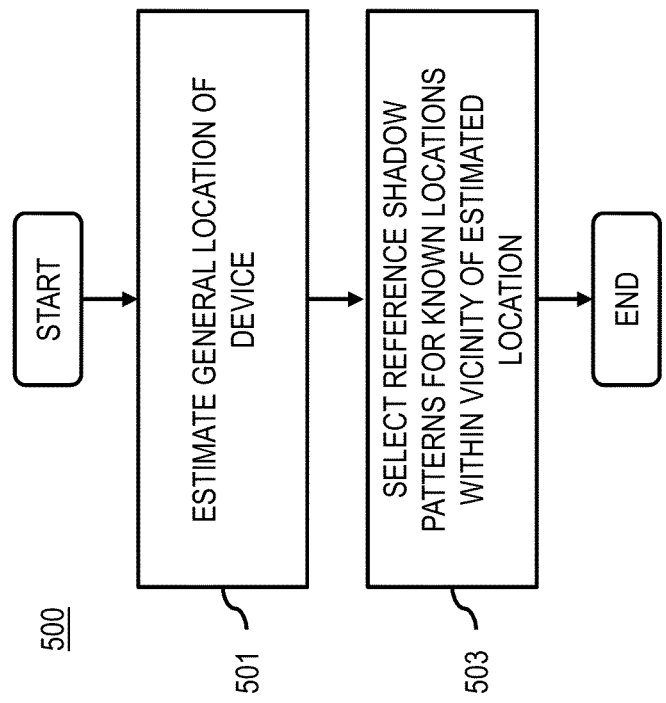
FIG. 5 is a flowchart of a process for configuring shadow-based location information at a device, according to one embodiment.

FIG. 5 is a flowchart of a process for configuring shadow-based location information at a device, according to one embodiment. In one embodiment, the visual location platform 103 performs the process 500 and is implemented in, for instance, a chip set including a processor and a memory as shown in FIG. 9. In addition or alternatively, the mapping/location-based application 113 can perform all or a portion of the process 500. The process 500 is an optional optimization of the process 400 whereby the visual location platform 103 filter or narrow the potential number of reference shadows that has to be searched by the visual location platform 103 to determine shadow-based location positioning information.

In step 501, the visual location platform 103 causes, at least in part, an estimation of a current location of the at least one device using one or more other location services (e.g., non-shadow-based location positioning such as GPS, cellular triangulation, etc.) of the device. This estimation, for instance, can be based on location data from the other location services that has been degraded because of signal interference or other performance issues (e.g., canyon effect for GPS signals). Then the visual location platform 103 causes, at least in part, a selection of the one or more reference patterns, the one or more known locations, or a combination thereof based, at least in part, on the estimation (step 503). For example, this process enables the platform 103 to narrow the area and accompany reference shadow patterns for which the platform 103 has evaluate to determine a device's location, thereby potentially reducing resource burdens.

Figure 6:
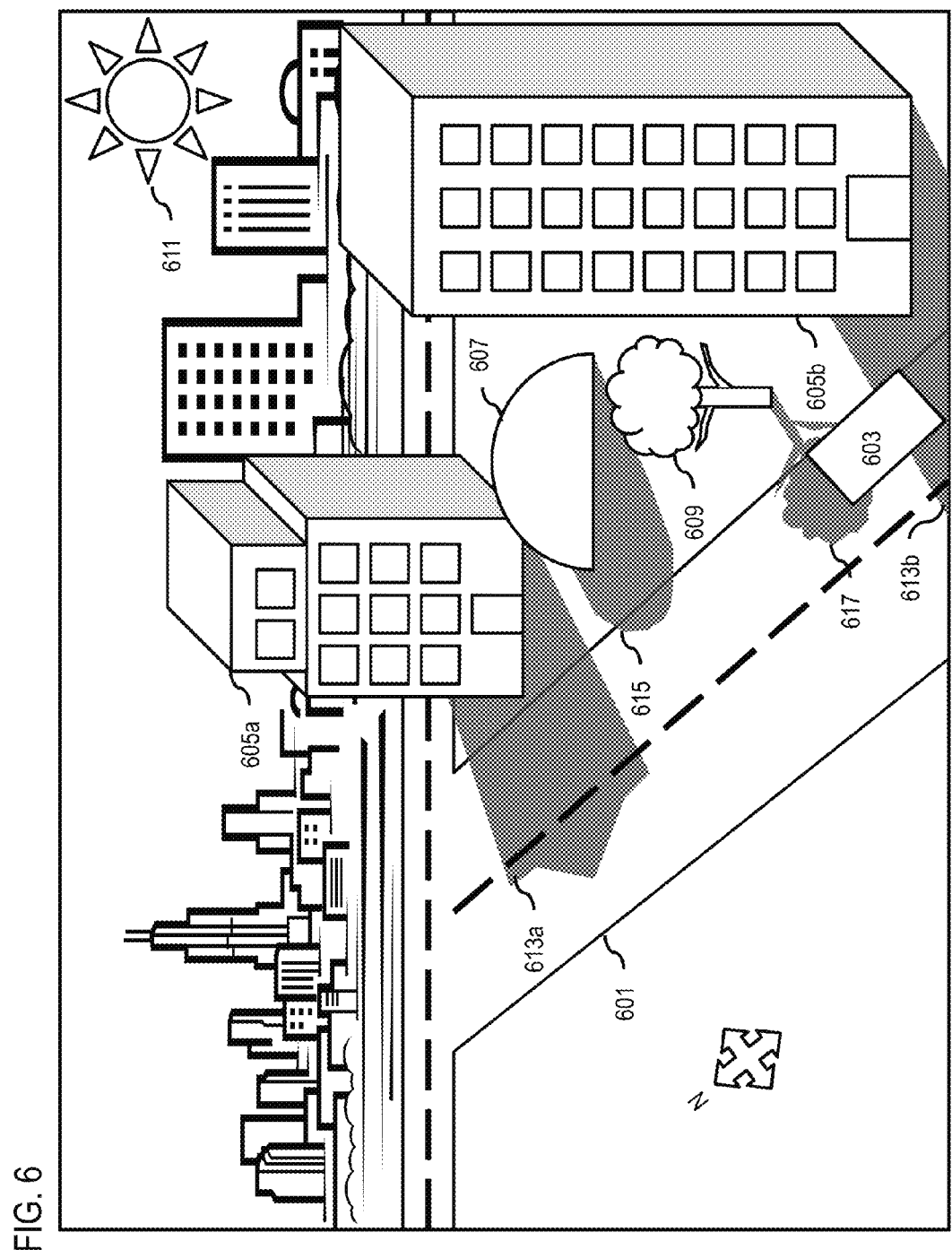
FIG. 6 is a diagram illustrating a process for estimating shadows based on geographic models, according to one embodiment.

FIG. 6 is a diagram illustrating a process for estimating shadows based on geographic models, according to one embodiment. The example of FIG. 6 depicts a representation of a three-dimensional model of a route 601 traveled by vehicle 603 equipped with a navigation system supporting shadow-based location positioning. As shown, the model of route 601 is lined with several features represented by building models 605a 605b (also collectively referred to as models 605), as well as a terrain model 607 representing a hill in the terrain and an object model 609 representing a tree. Based on the time of year and day, the visual location platform 103 estimates the position of the sun 613 behind the building models 605, the terrain model 607, and the object model 609. Using ray tracing or other rendering techniques, the visual location platform 103 estimates that the building models 605, the terrain model 607, and the object model 609 will cast shadows 613a and 613b (also collectively referred to as shadows 613) for building models 605, shadow 615 for terrain model 607, and shadow 617 for object model 609. The visual location platform 103 can then determine a reference shadow pattern comprising the shadows 613-617 as they fall on the street. In this case the individual widths of calculated shadows 609 form a unique sequence of shadow and light patterns on the street.

When the actual vehicle 603 travels along the real world equivalent route, the light sensors mounted on the car (e.g., mounted on the windshield) can detect the shadow patterns. For example, as the vehicle travels in the shadow 613b of building 605b, the light sensor indicates a period of dark. As the vehicle 603 continues past the tree 609, the terrain 607, and the building 605a, their respective shadows 617, 615, and 613a can complete the shadow pattern. This measured shadow pattern is then compared against the reference shadow pattern modeled for the same route 601 at the same time of year and day. Once the patterns are matched, the visual location platform 103 can estimate the vehicle's location as being on route 601.

In one embodiment, the order in which the vehicle 603 encounters the shadows 613-617 can indicate the direction of travel. For example, if the vehicle 603 encounters shadow 613b first and then shadows 617, 615, and 613a in sequence, the visual location platform 103 can estimate that the vehicle 603 is traveling north on route 601.

Figure 7:
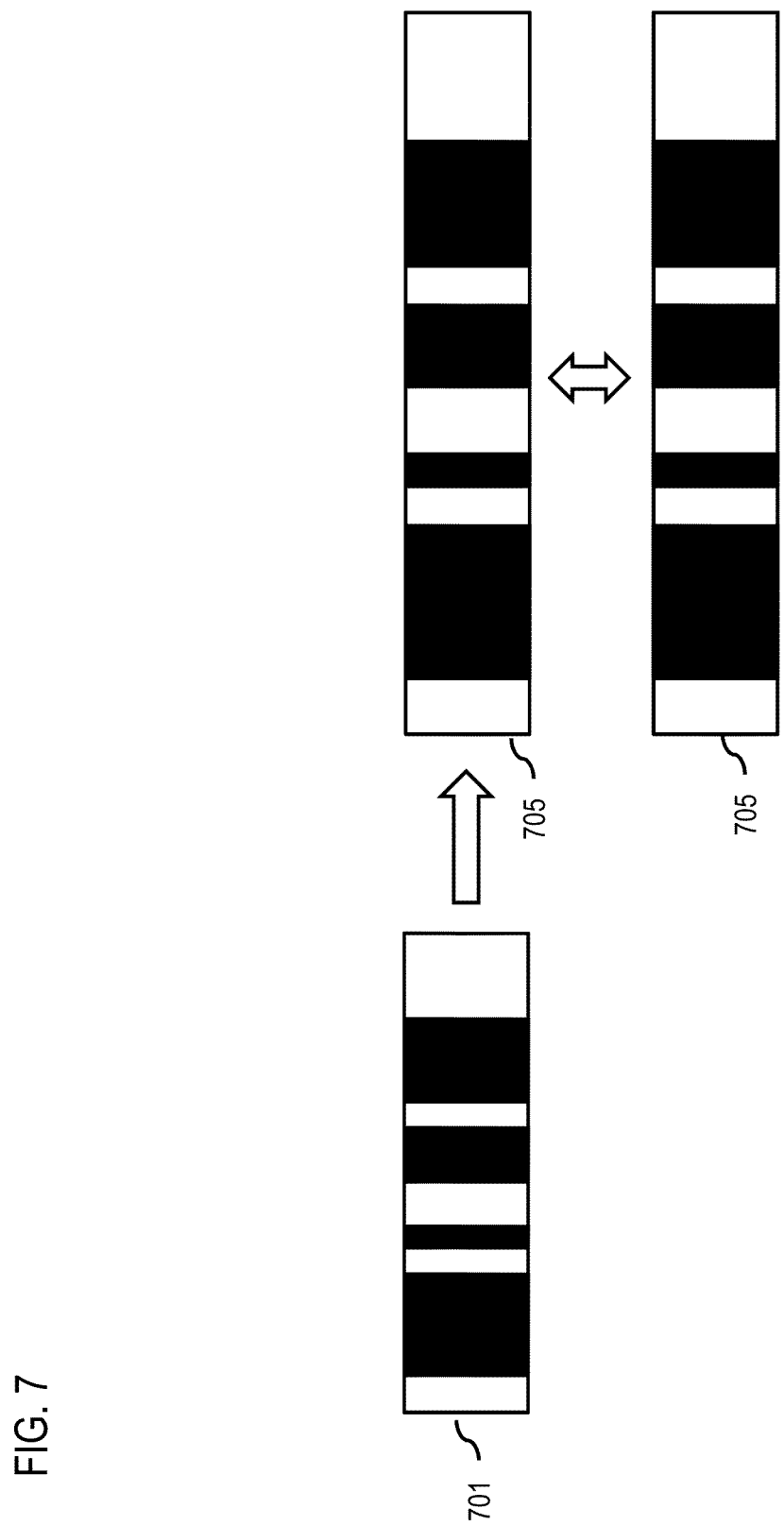
FIG. 7 is a diagram illustrating a process for normalizing shadow patterns based on a speed of a device determining the shadow patterns, according to embodiment.

FIG. 7 is a diagram illustrating a process for normalizing shadow patterns based on a speed of a device determining the shadow patterns, according to embodiment. As shown, measured shadow pattern 701 represents the sequence of shadows measured by the vehicle 603 as it traveled along the route 601 of FIG. 6. In this case, the pattern indicates four shadow periods corresponding to building 605b, tree 609, hill 607, and building 605a respectively. However, the vehicle 603 was moving at a relatively higher rate compared to the scale of the reference shadow pattern 703. To account for the difference in scale, the visual location platform 103 normalizes the measured shadow pattern 701 based on a determined speed of the vehicle 603 as it collected light measurements. The normalization results in the normalized measured shadow pattern 705, which can then be determined to match the reference shadow pattern 705, thereby enabling a location determination.

The processes described herein for providing shadow-based location positioning may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
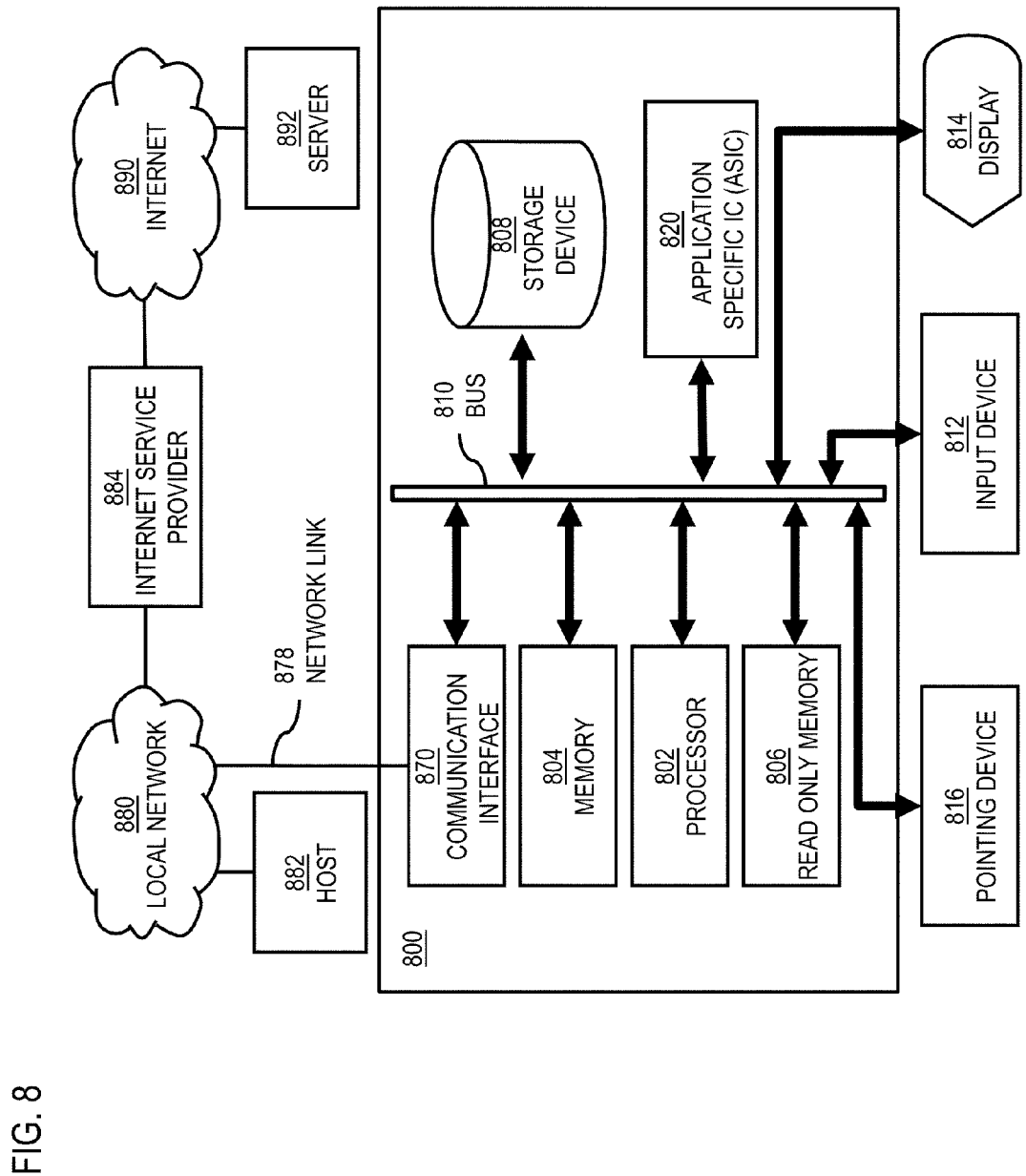
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide shadow-based location positioning as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing shadow-based location positioning.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing shadow-based location positioning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing shadow-based location positioning. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing shadow-based location positioning, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing shadow-based location positioning to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide shadow-based location positioning as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing shadow-based location positioning.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide shadow-based location positioning. The memory 905 also stores the data associated with or generated by the execution of the inventive steps.

Figure 10:
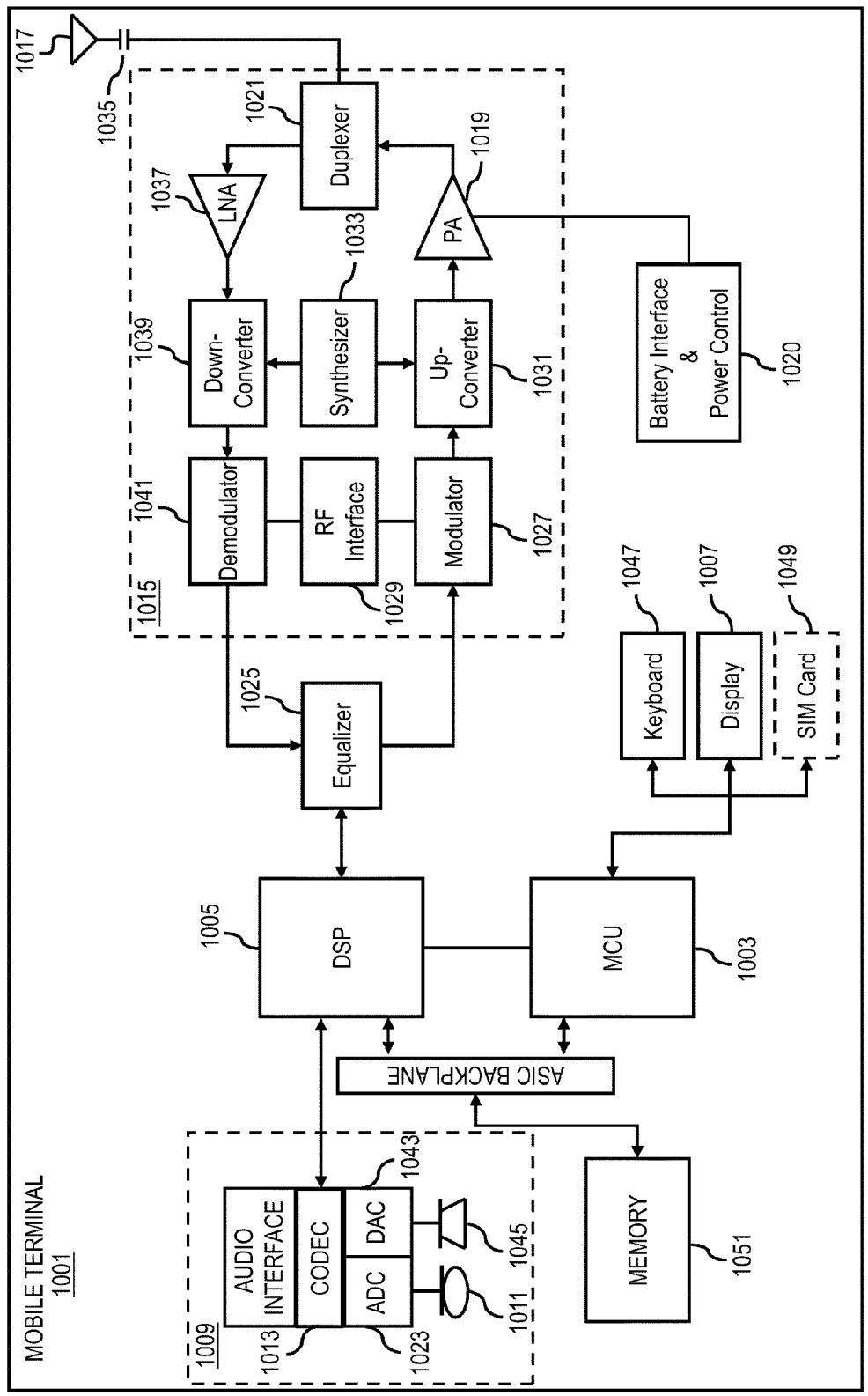
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing shadow-based location positioning. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing shadow-based location positioning. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide shadow-based location positioning. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   a processing of sensor information associated with at least one device traveling on at least one route to determine at least one pattern of shadows on the at least one route;
   a comparison of the at least one pattern of shadows against one or more reference patterns of shadows associated with one or more known locations; and
   an estimation of a location, a direction of travel, or a combination thereof of the at least one device based, at least in part, on the comparison;
   wherein the at least one pattern of shadows includes lighter and darker sections corresponding to shadows casted on the route by environmental features surrounding the route and sensed by the traveling device.

2. A method of claim 1, wherein the (1) data and/or (2) information and/or (3) at least one signal are further based, at least in part, on the following:
   one or more models of one or more features associated with the one or more known locations; and
   a processing of the one or more models to determine one or more shadows cast at the one or more known locations;
   wherein the one or more reference patterns of shadows are based, at least in part, on the one or more shadows.

3. A method of claim 2, wherein the (1) data and/or (2) information and/or (3) at least one signal are further based, at least in part, on the following:
   at least one determination of the one or more reference patterns of shadows, the one or more shadows cast at the one or more known locations, or a combination thereof based, at least in part, on a time-of-day parameter, a time-of-year parameter, or a combination thereof.

4. A method of claim 2, wherein the one or more features include one or more buildings, one or more terrain features, or a combination thereof associated with the one or more known locations.

5. A method of claim 1, wherein the (1) data and/or (2) information and/or (3) at least one signal are further based, at least in part, on the following:
   a normalization of the at least one pattern of shadows based, at least in part, on a speed of the at least one device.

6. A method of claim 1, wherein the (1) data and/or (2) information and/or (3) at least one signal are further based, at least in part, on the following:
   at least one determination of the one or more patterns based, at least in part, on a presence or an absence of shadow as indicated by the sensor information.

7. A method of claim 1, wherein the (1) data and/or (2) information and/or (3) at least one signal are further based, at least in part, on the following:
   an estimation of a current location of the at least one device using one or more location services of the device; and
   a selection of the one or more reference patterns, the one or more known locations, or a combination thereof based, at least in part, on the estimation.

8. A method of claim 1, wherein the sensor information includes, at least in part, light sensor information, visual detector information, or a combination thereof.

9. An apparatus comprising:
   at least one processor; and
   at least one memory including computer program code for one or more programs,
   the at least one memory and the computer program code configured to, with the at least one processor, cause the apparatus to perform at least the following,
       process and/or facilitate a processing of sensor information associated with at least one device traveling on at least one route to determine at least one pattern of shadows on the at least one route;
       cause, at least in part, a comparison of the at least one pattern of shadows against one or more reference patterns of shadows associated with one or more known locations;
       cause, at least in part, an estimation of a location, a direction of travel, or a combination thereof of the at least one device based, at least in part, on the comparison; and
       wherein the at least one pattern of shadows includes lighter and darker sections corresponding to shadows casted on the route by environmental features surrounding the route and sensed by the traveling device.

10. An apparatus of claim 9, further comprising:
    determine one or more models of one or more features associated with the one or more known locations; and
    process and/or facilitate a processing of the one or more models to determine one or more shadows cast at the one or more known locations;
    wherein the one or more reference patterns of shadows are based, at least in part, on the one or more shadows.

11. An apparatus of claim 10, further comprising:
    determine the one or more reference patterns of shadows, the one or more shadows cast at the one or more known locations, or a combination thereof based, at least in part, on a time-of-day parameter, a time-of-year parameter, or a combination thereof.

12. An apparatus of claim 10, wherein the one or more features include one or more buildings, one or more terrain features, or a combination thereof associated with the one or more known locations.

13. An apparatus of claim 9, further comprising:
    cause, at least in part, a normalization of the at least one pattern of shadows based, at least in part, on a speed of the at least one device.

14. An apparatus of claim 9, further comprising:
    determine the one or more patterns based, at least in part, on a presence or an absence of shadow as indicated by the sensor information.

15. An apparatus of claim 9, further comprising:
    cause, at least in part, an estimation of a current location of the at least one device using one or more location services of the device; and
    cause, at least in part, a selection of the one or more reference patterns, the one or more known locations, or a combination thereof based, at least in part, on the estimation.

16. An apparatus of claim 9, wherein the sensor information includes, at least in part, light sensor information, visual detector information, or a combination thereof.

17. A computer-readable storage medium carrying one or more sequences of one or more instructions which, when executed by one or more processors, cause an apparatus to at least perform the following steps:
    processing and/or facilitating of sensor information associated with at least one device traveling on at least one route to determine at least one pattern of shadows on the at least one route;
    causing, at least in part, a comparison of the at least one pattern of shadows against one or more reference patterns of shadows associated with one or more known locations;
    causing, at least in part, an estimation of a location, a direction of travel, or a combination thereof of the at least one device based, at least in part, on the comparison; and
    wherein the at least one pattern of shadows includes lighter and darker sections corresponding to shadows casted on the route by environmental features surrounding the route and sensed by the traveling device.

18. A computer-readable storage medium of claim 17, wherein the apparatus is caused to further perform:
    determining one or more models of one or more features associated with the one or more known locations; and
    processing and/or facilitating a processing of the one or more models to determine one or more shadows cast at the one or more known locations;
    wherein the one or more reference patterns of shadows are based, at least in part, on the one or more shadows.

19. A computer-readable storage medium of claim 18, wherein the apparatus is caused to further perform:
    determining the one or more reference patterns of shadows, the one or more shadows cast at the one or more known locations, or a combination thereof based, at least in part, on a time-of-day parameter, a time-of-year parameter, or a combination thereof.

20. A computer-readable storage medium of claim 18, wherein the one or more features include one or more buildings, one or more terrain features, or a combination thereof associated with the one or more known locations.

* * * * *